July 22, 1941.　　　　P. KUCERA　　　　2,250,110
GLASS FEEDING
Filed Nov. 9, 1939　　　　2 Sheets-Sheet 1

INVENTOR
Peter Kucera
BY
Emery, Varney, Whittemore
ATTORNEYS

July 22, 1941.   P. KUCERA   2,250,110
GLASS FEEDING
Filed Nov. 9, 1939   2 Sheets-Sheet 2
Fig. 4.
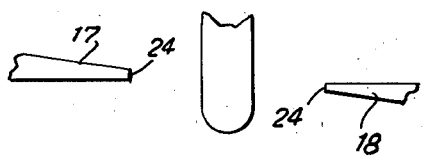
Fig. 3.
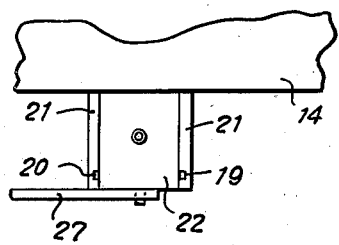
Fig. 7.
Fig. 5.
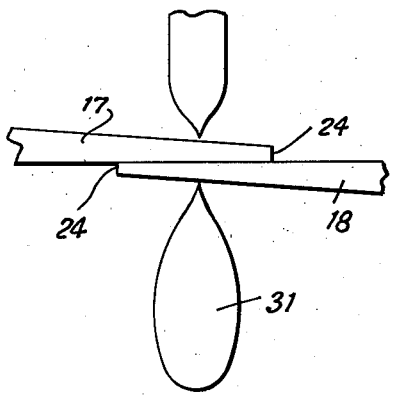
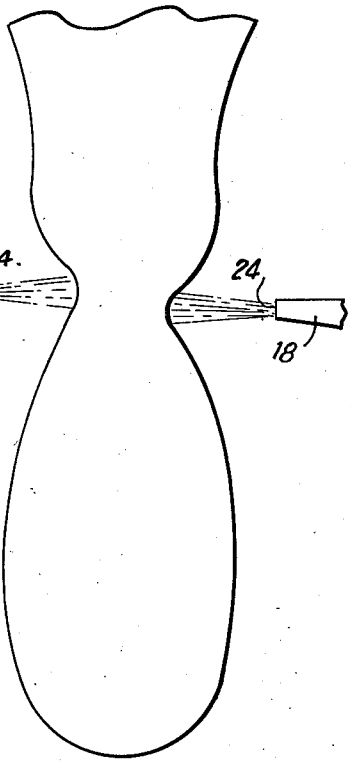
Fig. 6.
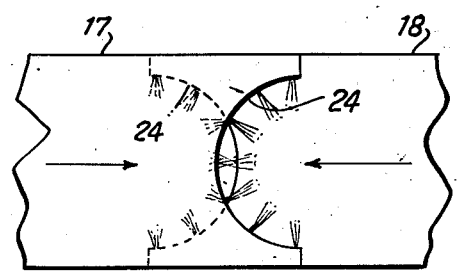
INVENTOR
Peter Kucera
BY
Emery, Varney, Whittemore & Dix
ATTORNEYS Patented July 22, 1941

2,250,110

UNITED STATES PATENT OFFICE 2,250,110

GLASS FEEDING

Peter Kucera, Allison Park, Pa.

Application November 9, 1939, Serial No. 303,510

8 Claims. (Cl. 49—77)

This invention relates to feeding of molten glass and an object is to provide an improved method for forming and delivering mold charges of molten glass from a batch or mass thereof.

A further object is to provide an improved method for severing glass into mold charges, to produce mold charges free of shear marks.

These and other objects, which will be apparent to those skilled in the art, are accomplished by the invention illustrated in the accompanying drawings in which Fig. 1 is a view partly in section showing one embodiment of a shear mechanism which is arranged to sever mold charges from glass issuing through a submerged flow orifice in accordance with the present invention.

Fig. 3 is a side elevation of Fig. 1.

Figs. 4, 5, 6 and 7 are diagrammatic views indicating the operation of the method upon molten glass.

Figure 1:
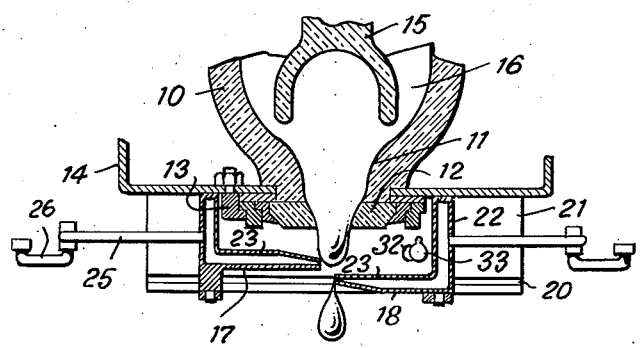
Figure 2:
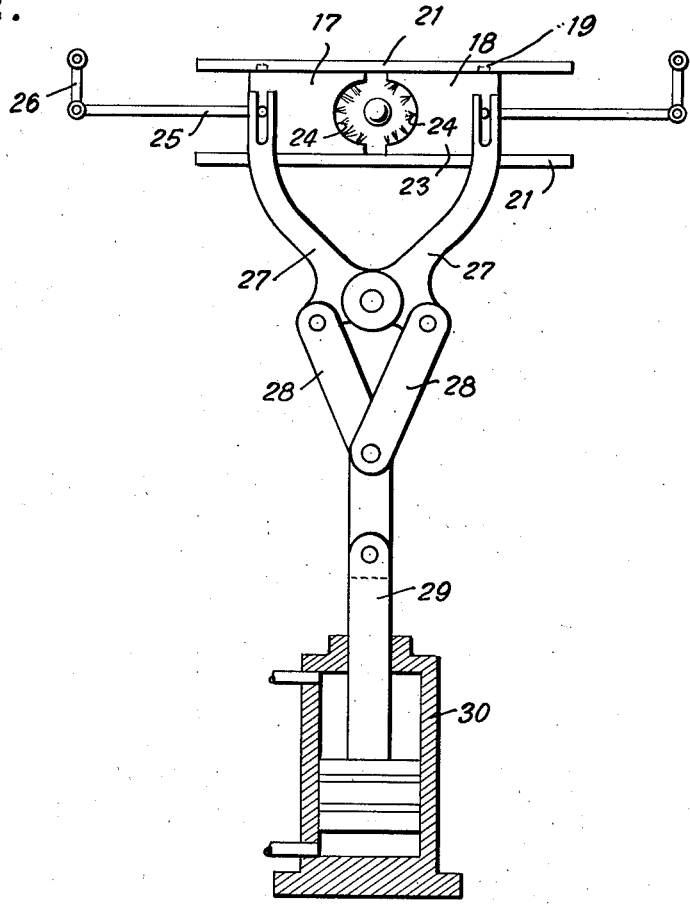
Fig. 2 is a bottom plan view, partly in section, of one form of shear actuating mechanism adapted to operate the shear device shown in Fig. 1.

As illustrated, the invention is shown in connection with a feeding device including the usual boot terminating in a well 10 having a submerged flow orifice 11 below which an orifice ring 12 is secured by clamping means 13 which support the ring on a metallic casing 14 surrounding the boot in a well known manner.

Above the orifice, within the well 10 is mounted by any conventional means well known in the art an adjustable inverted bell 15, the vertical adjustment of which determines the size of the annular opening 16 between the mouth of the bell and the adjacent inner faces of the well 10, the size of which opening in turn determines the rate of flow of the molten glass through the orifice 11.

The particular embodiment of the shearing mechanism herein illustrated comprises a pair of reciprocating gaseous fuel burners 17, 18 slidably mounted below the flow orifice for reciprocation toward and from the glass issuing from the orifice. Each burner has a supporting lug 19 on each side thereof slidable in horizontal grooves 20 near the lower edges of spaced vertical burner supporting brackets 21.

Each burner is formed so as to provide a substantially closed space around the orifice when the burners have moved into glass severing position as shown in Figs. 1, 5 and 6. As illustrated, this is accomplished by forming each burner of general L shape with an upright wall portion 22 extending across and substantially closing the space between the side brackets 21, and a lower horizontal wall portion 23 extending across and closing the space between the lower edges of the side brackets. The burner nozzles 24 are arcuate or semi-circular in shape and gaseous fuel or the like is supplied to the burners under pressure through supply lines 25 movable with the burner and connected to suitable sources of supply through swinging supply lines 26.

One advantage of the present invention is that it is adapted to be operated by conventional shear operating mechanism such, for example, as the pivoted arms 27 connected by links 28 to a plunger 29 adapted to be reciprocated by any suitable mechanism such as the piston and cylinder 30.

In operation, the molten glass in the well 10 flows under the influence of gravity through the discharge orifice 11 and orifice ring 12, the rate of flow being controlled by the position of the bell 15. The operation of the shearing mechanism is so co-ordinated with the flow of the glass as to produce mold charges of a predetermined weight. The diameter of the mold charge is controlled by the diameter of the opening in the orifice ring 12. Rings having openings of different diameters can be employed, to vary the diameter of the mold charge. The shape of the charge is controlled by timing the shearing operation with relation to velocity of flow through the discharge orifice. For example, a short fat mold charge can be produced by employing an orifice ring with a large opening and timing the shearing operations so as to sever relatively short mold charges from the fat body of glass issuing therefrom. On the other hand long thin mold charges can be formed by employing an orifice ring having a smaller opening and timing the shearing operation so as to provide elongated mold charges from the glass issuing through the orifice. Obviously, considerable variation can be obtained by those skilled in the art.

As the gaseous fuel burners approach the glass issuing from the orifice, the speed of the burners increases and the pressure of the hot fluid or flame issuing from the nozzles also increases. Movement of the burners causes this fluid pressure to penetrate the glass somewhat in the manner diagrammatically indicated in Fig. 7 and as the burners approach each other the fluid pressure of the fuel is driven through the molten glass with the result that a mold charge 31 is severed and drops into an associated mold or the like in the well known manner. The burners approach each other substantially to the point diagrammatically shown in Fig. 6 at which point the gaseous fuel has severed the mold charge without there being any contact of a metallic or other chilling surface with the heated glass so that the mold charge bears no "shear marks" and the finished glass product similarly is free from defects caused by the shearing operation. It should be clearly understood that the fluid pressure employed to sever mold charges may be produced by air or gas heated to a temperature above that of the molten glass, or by a gaseous flame. Wherever the terms "gaseous fuel" or "gaseous fuel burner" or the like are employed I intend to include any suitable form of fluid pressure at an elevated temperature.

The movement of the fuel burners toward each other produces a more or less enclosed space outside of the flow orifice, just below the severed stub. As a result of the operation of the fuel burners, the pressure within this space is built up to such a point that the flow of glass through the orifice is temporarily impeded or, if desired, may be actually stopped momentarily after the severing operation. The heat and pressure prevent any chilling effect upon the stub and the pressure may be built up to such a point that the stub itself is forced upwardly into the orifice. However, the usual operation will be such that the stub is simply momentarily held against downward movement. The actual pressure built up within this space enclosing the orifice is regulated by any suitable pressure regulator such as a vent opening 32 in one bracket wall 21, the size of which is controlled by a cover 33 or similar closure. Retraction of the burners to a position shown in Fig. 4 relieves all pressure and permits the glass to flow downwardly again through the orifice whereupon the operation is repeated. The two burners are on different levels and their operation and penetration of the molten glass is in the manner of a true shearing operation.

Obviously the invention can be variously modified and adapted within the scope of the appended claims.

I claim:

1. The method of severing glass which consists in passing fluid under pressure through a mass of molten glass and increasing the pressure of said fluid as the severing operation proceeds.

2. The method which consists in passing fluid under pressure through a body of molten glass to sever a mold charge therefrom, and increasing the pressure of said fluid and its velocity through said glass as the severing operation proceeds.

3. The method of delivering mold charges of molten glass which comprises flowing molten glass through a discharge orifice, and reciprocating gaseous fluid under pressure back and forth across the path of glass flowing through said orifice to sever successive mold charges therefrom.

4. The method of delivering mold charges of molten glass which comprises flowing molten glass through a discharge orifice, reciprocating gaseous fluid under pressure back and forth across the path of glass flowing through said orifice to sever successive mold charges therefrom, and reducing the flow of glass through said orifice by said fluid pressure.

5. The method of delivering mold charges of molten glass from a batch thereof which consists in flowing glass from said bath through a discharge orifice, simultaneously passing separate areas of fluid pressure through the glass issuing from said orifice from opposite sides thereof at different levels, and then withdrawing said fluid pressure therefrom.

6. The method of delivering mold charges of molten glass which consists in flowing glass through a discharge orifice, applying fluid pressure to opposite sides of the glass issuing from said orifice and passing said pressure therethrough to sever a mold charge therefrom, confining the fluid pressure within a restricted space outside of and adjacent to said orifice so as to diminish the flow therethrough, and then opening said space to relieve said pressure and increase the flow through said orifice.

7. The method of delivering mold charges of molten glass which comprises flowing glass through a discharge orifice, applying fluid pressure on opposite sides of the glass issuing from said orifice and passing said pressure therethrough to sever a mold charge therefrom, confining the fluid pressure within a restricted space outside of and adjacent to said orifice to diminish the flow therethrough, limiting the maximum pressure to a predetermined value, and then relieving said pressure and increasing the flow through said orifice.

8. The method of delivering mold charges of molten glass which comprises flowing glass through a discharge orifice, applying fluid pressure to opposite sides of the glass issuing from said orifice and passing said pressure therethrough at different levels to sever a mold charge therefrom, controlling the rate of flow through said orifice and coordinating the severing of said mold charges with the controlled rate of flow to produce a mold charge of predetermined weight and size.

PETER KUCERA.